United States Patent [19]

Stevens

[11] 4,194,746

[45] Mar. 25, 1980

[54] RADIALLY COMPRESSED ROTARY SHAFT SEALING DEVICE

[76] Inventor: James N. Stevens, 1016 W.Montana, Chicago, Ill. 60614

[21] Appl. No.: 916,081

[22] Filed: Jun. 16, 1978

[51] Int. Cl.² .............................................. F16J 15/46
[52] U.S. Cl. ..................................... 277/34.3; 277/45; 277/48; 277/105
[58] Field of Search ................. 277/34, 34.3, 35, 36, 277/45, 47–49, 105, 116.2, 226

[56] References Cited

U.S. PATENT DOCUMENTS

| | | | |
|---|---|---|---|
| 315,350 | 4/1885 | Shook | 277/105 |
| 2,369,823 | 2/1945 | Freed | 277/34.3 |
| 2,822,192 | 2/1958 | Beatty | 277/34.3 |
| 3,226,126 | 12/1965 | Plate | 277/34 X |
| 3,338,583 | 8/1967 | Isdale | 277/34.3 |

FOREIGN PATENT DOCUMENTS 69553  7/1893  Fed. Rep. of Germany ........... 277/105

*Primary Examiner*—Robert S. Ward, Jr.
*Attorney, Agent, or Firm*—Nilsson, Robbins, Dalgarn, Berliner, Carson & Wurst

[57] ABSTRACT

A shaft sealing apparatus for attachment about a rotatable shaft for preventing leakage along the shaft, has a housing with a fixed end plate and a movable gland follower for defining a stuffing box about the shaft. One or more packing assemblies are positioned axially adjacent one another in the stuffing box. Each packing assembly has a compressible packing encircling the shaft, a fluid filled elastomeric compression torus or ring encircling the compressible packing and an axially movable spacer positioned around the shaft adjacent the compressible packing and the compression ring. The spacer may be hollow with an input and exit port for circulating a coolant fluid therethrough. The spacer may also have a radial passageway which is opened to the surface of the shaft whereby lubricant can be applied to the shaft. The gland follower exerts a constant axial force on the packing assemblies.

5 Claims, 7 Drawing Figures

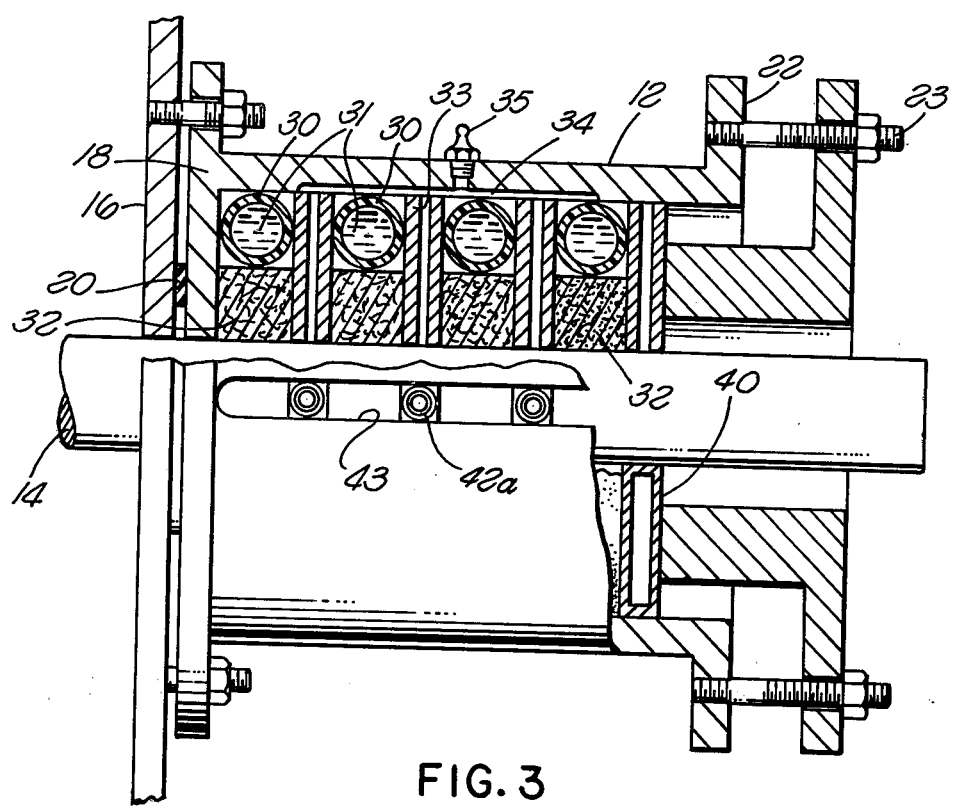
FIG. 3
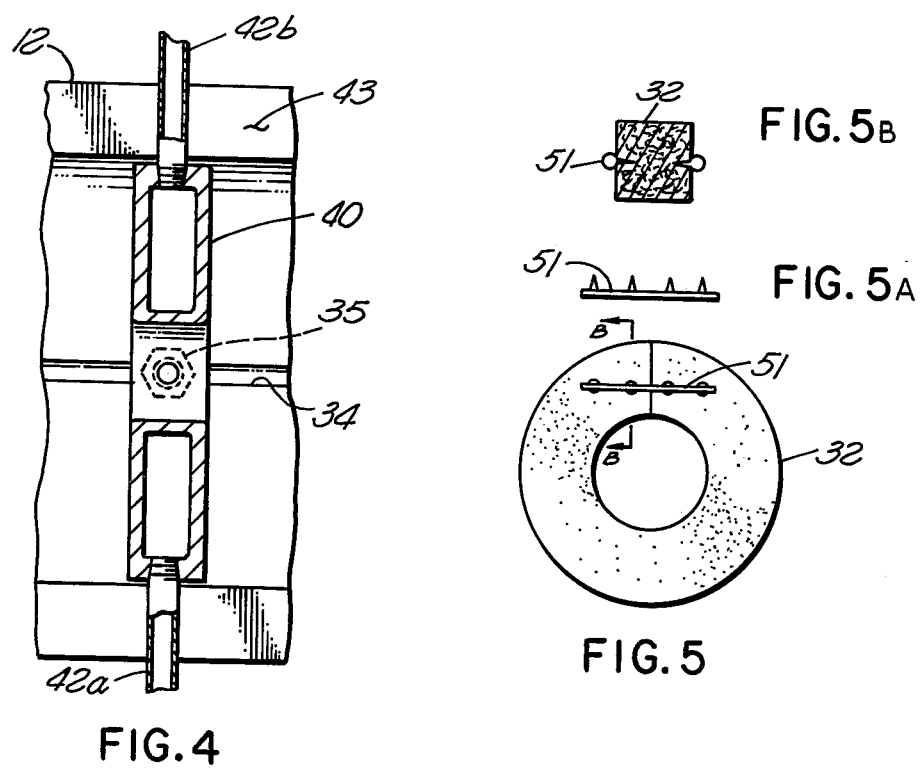
FIG. 4
FIG. 5B
FIG. 5A
FIG. 5

RADIALLY COMPRESSED ROTARY SHAFT SEALING DEVICE

BACKGROUND OF THE INVENTION

This shaft sealing device is particularly adaptable to machines, such as screw conveyors, mixers, blenders, pumps and other processing equipment handling liquids, dry solids and slurries and having in common a rotating shaft communicating through the confining wall of a vessel.

In its simplest form (FIG. 1), it is a cylindrical cartridge comprised of a housing; an elastomeric, fluid-filled, self-contained compression ring; compartment spacers, which may be drilled to allow passage of a pressurized lubricant into the cartridge; mechanical packing of any variety which intervenes between the fluid-filled ring and the rotating shaft; and an externally adjustable gland follower. The cartridge is mounted radially over the rotating shaft and provides a means of applying uniform radial force to the intervening packing without the necessity of an external source of fluid pressure, as is common in diaphragm-type seals.

The method of fabricating the monolithic fluid-filled compression ring is novel in that advantage is taken of the volume change which occurs when selected organic fluids are cooled to sub-zero temperatures and atmospherically reheated to ambient temperatures.

Polyaromatic compounds, modified esters and dextrose solutionsare typical of the organic materials employed.

FIG. 2, is a representation of the individual shapes of the components in the compressed state.

In a second form (FIG. 3), the compartment spacers form a contiguous multiple compartment seal with each compartment subjected to equal radial pressures imposed by the gland follower.

In a third form (FIG. 4), the compartment spacers are hollow metallic or polymer rings, having an inlet and outlet tube to permit simultaneous cooling of the in-contact elastomeric fluid-filled ring and the mechanical packing. The rotating, heat conducting shaft metal, is coincidently cooled.

In a fourth form the compartment spacers are common lantern rings to provide a means for continuous flushing of the individual compartments of a single or multiple compartment seal.

Hitherto, shafts have been sealed by means of conventional stuffing boxes, including mechanical packings consisting of annular gaskets compressed by annular gland followers moved axially against the packing, thereby converting axial force to radial components of force. A large proportion of the axial force is consumed in compression of the mechanical packing. Mechanical packing takes the shape of the restraining container and is subjected to deformation due to eccentric rotation of the shaft. The resulting phenomena is termed "pumping the seal".

The second generation in development of conventional stuffing boxes included pressurized diaphragms having an independent source of fluid pressure, usually fluid from the discharge side of a pump or an air compressor. The diaphragm seals proved unsatisfactory for several reasons: (a) sealing pressure failed during power failures; (b) temperature tends to build up due to frictional heat, thus thermally expanding the enclosed fluid in an uncontrollable manner; (c) mechanical arrangement of the seals did not permit flushing or lubrication of the shaft at the packing interface.

SUMMARY OF THE INVENTION

In contrast to prior art relating to shaft sealing devices, the present invention provides means for applying direct radial force to mechanical packing by compressing the fluid in a hermetically sealed, self-contained elastomeric ring by converting mechanically applied axial pressure to hydraulic pressure by deforming the ring. In effect then, the eccentric motion of a rotating shaft is compensated for by relocation of the fluid within the elastomeric ring. A self-centering sealing means is thus provided.

The present invention incorporates the facility to provide uniform sealing pressures to multiple compartments in a single seal cartridge.

The number of compartments required in a single seal is related to the operating pressure of the apparatus or machine to which it is attached.

The interspersing of an indirect, non wetting cooling means to simultaneously cool two sides of each ring of mechanical packing and the elastomeric ring is novel in the art.

The method of fabrication of the self-contained fluid-filled elastomeric ring is novel in that liquid filling is accomplished without the use of either filling or vent valves. Chilling the fluid to sub-zero temperatures and filling the tubular element in a moisture and carbon dioxide-free atmosphere is a required procedure. The sub-cooled fluids used have the physical property of volume changes in the range of 7-10% upon heating to ambient temperature from the sub-cooled temperatures employed.

BRIEF DESCRIPTION OF THE DRAWINGS

In the Drawings:

FIG. 3, is a fragmentary central vertical section, cut axially through the central portion of a protruding shaft communicating through a vessel wall and a multicompartmented form of the shaft seal;

FIG. 4, is a fragmentary vertical section of the hollow compartment spacer used for the purpose of internally cooling the compression rings and packing in an indirect manner. The slotted housing wall is shown as provision for movement of the spacers which move axially in the direction of the vessel when the seal is under compression;

FIGS. 5 and 5A, are the illustrations of the closure pin arrangement at the abutting ends of the mechanical packing rings.

FIG. 5B is a cross-sectional view through the packing ring of FIG. 5 showing the interconnection of the packing ring and closure pins.

DETAILED DESCRIPTION

Figure 1:
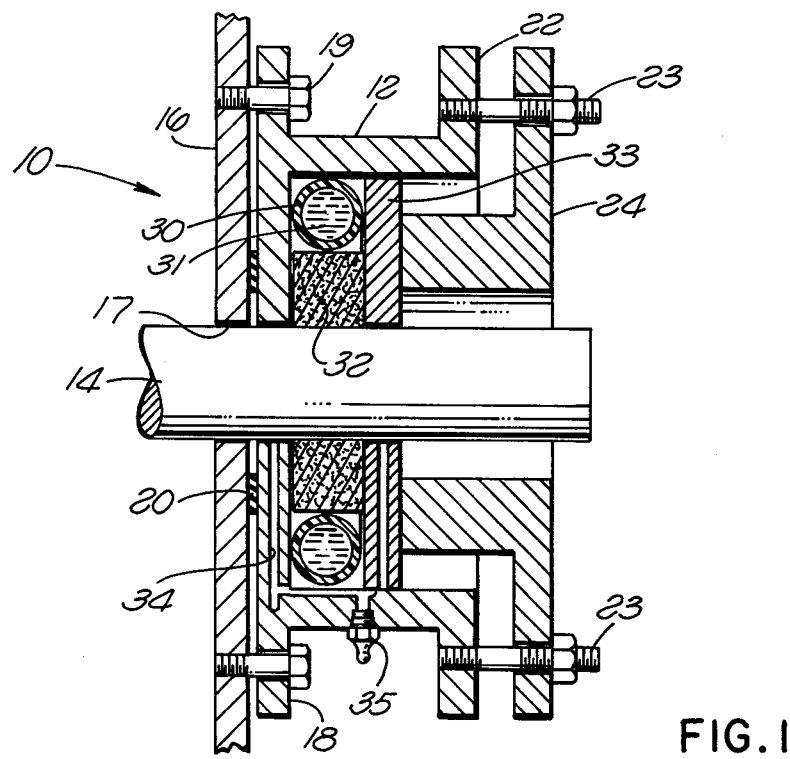
FIG. 1, is a fragmentary central vertical section, cut axially through the central portion of a protruding shaft communicating through a vessel wall and the shaft seal. As shown, the seal is in a non-compressed condition. This drawing represents the invention in its simplest form.

Referring to the drawing in detail, FIG. 1 shows a screw conveyor, or other type of process equipment, designated 10, provided with a radially compressed shaft seal device generally designated 12 according to the simplest form of the invention mounted to contain a rotating shaft designated 14 to which is attached a conventional helical screw conveyor, or other type of conveying, mixing or pumping appurtenance. The helical conveyor is mounted in a trough having an end plate 16 containing a shaft bore 17 through which the rotary shaft communicates to the external bearing. The seal housing wall 18 is bolted to the end plate 16 with gasket seal 20 intervening. The seal housing is centered on shaft 14 to minimize eccentricity. The housing 12 is fitted with integral bolting flange 22 which is tapped to receive compression bolts 23 which, in turn, support gland follower 24.

The internals of the seal consist of a fluid-filled elastomeric compression ring 30 which includes a standard mechanical packing material 32. Compartment spacer 33 forms the bearing plate for applying pressure to the compression ring 30 when gland follower 24 is moved forward by tightening bolts 23. Compartment spacer 33 is drilled to permit pressure port lubrication to the shafts through passageway port 34. Grease fitting 35 is threaded into the passageway 34.

In operation of the shaft sealing device 12 bolts 23 are tightened and compress the fluid-filled elastomeric ring 30 so as to take the shape of the resultant compartment containing both the ring 30 and split mechanical packing 32 and encased by rotating shaft 14 and inner walls of seal device 12. The radially compressed mechanical packing presses uniformly on the surface of rotating shaft 14 and effects a seal.

Eccentric rotation of shaft 14 has the effect of relocating the fluid 31 in the fluid-filled elastomeric ring 30, thus adapting the seal to the changing center of rotation. The center of rotation of shaft 14 changes, however, the radial forces on the mechanical packing 32 remain constant.

Figure 2:
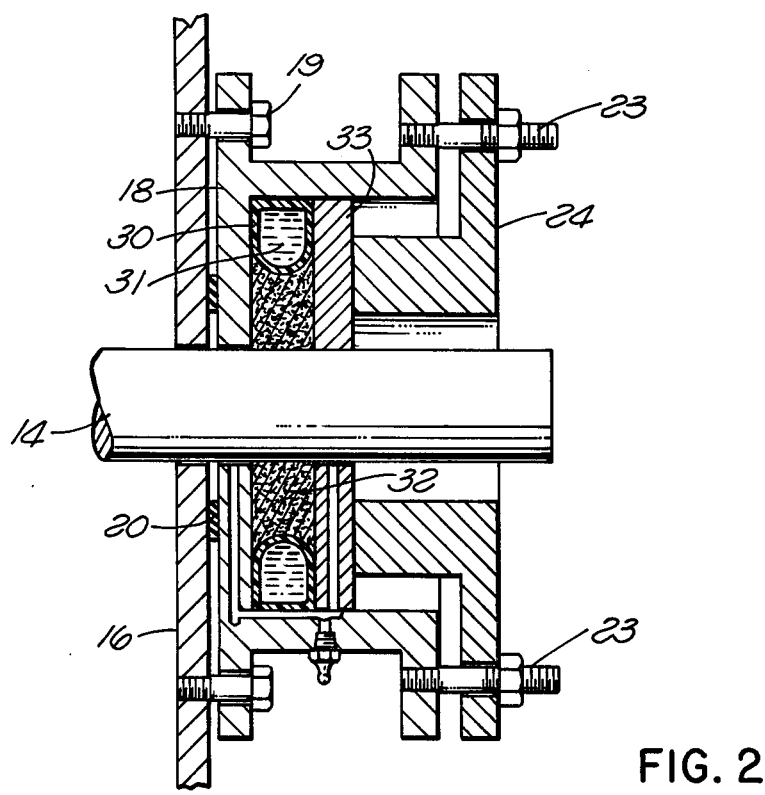
FIG. 2, is a fragmentary central vertical section, cut axially through the central portion—similar to FIG. 1, except that the seal is in a normal compressed condition.

FIG. 2 is a representation of the deformation of the fluid-filled elastomeric ring 30 and the mechanical packing 32. The mechanical packing material 32 is compressible and is invaded by the compression ring 30 to form a concave groove at the interface. The effect is to increase the bearing area of the materials and prevent rotation of packing material with rotating shaft 14.

A pressure seal is formed between the compressed fluid-filled elastomeric ring 30 and the vertical faces of the compartment spacers 33. The housing can be slotted to provide for longitudinal movement of hollow compartment spacers when indirect cooling of the seal internals is required.

The modified shaft sealing device shown in FIG. 3 is a multiple compartment arrangement utilizing the same elements as shown in FIG. 1, hence all similar parts are designated with the same reference numerals. The number of compartments is determined by the operating pressure of the vessel system.

Hydraulic pressure developed in the fluid-filled elastomeric compression rings 30 when tightening bolts 23 is uniformly transmitted to each separate compartment comprised of a compression ring 30, mechanical packing 32 and compartment spacer 33. The radial force is therefore equal at the packing and shaft interface at each compartment.

A further modification of the invention is represented in FIG. 4 where the compartment spacers 40 are hollow metallic rings having an ingress opening 42a and discharge opening 42b passing through slotted section 43 of the sealing device wall 12. Slots are required to allow for axial movement of the spacers when applying pressure as a result of tightening the take up bolts 23. A seal to atmosphere is maintained as noted in the description of FIG. 2.

As shown in FIG. 5, the abutting ends of the mechanical packing 32 are secured in a fully completed circle by closure pins 51. In practice it was found that simultaneous deformation of mechanical packing 32 and compression ring 30 resulted in an unpredictable flow of the pliant packing material within each compartment. The resulting gap at the point of abuttment thus violated the integrity of the seal.

This invention has been described and illustrated in the drawings as applied to rotating shafts; however, it would also be evident to those skilled in the art that it is equally applicable to sealing of reciprocating shafts.

A further application would include sealing shafting where the sealing surface changes relative location with respect to the fixed positioned sealing device as demonstrated for example by a rising stem valve.

The materials of construction for use in fabricating the compression rings are natural and synthetic elastomers and must be compatable with the entrapped fluid as well as the processed material in the vessel to which it is attached.

The wearing part of the sealing device is the mechanical packing material 32. To replace the split packing, it is unnecessary to unbolt the entire cartridge 12. Removing the gland follower 24 and retracting the individual compartments and the contents is readily accomplished. The new split mechanical packing material is inserted under the compression ring 30 starting from the innermost compartment and pushed into place.

I claim:

1. A shaft sealing assembly for attachment about a rotatable shaft for preventing leaking along the shaft comprising:

an elongated housing defining a chamber therein, the housing positioned about the shaft, the shaft extending through the chamber;

end plate means having an opening therethrough, the end plate means enclosing one end of the chamber with the shaft passing through the opening therethrough;

at least one packing means positioned in the chamber and encircling the shaft, the packing means positioned adjacent one another along the shaft, each packing means comprising:

a compressible packing encircling the shaft;

a fluid filled elastomeric compression ring encircling the compressible packing, the compression ring having an enclosed, hollow toroidal region therein for retaining the fluid; and spacer means positioned around the shaft, and axially adjacent to the compressible packing and the elastomeric compression ring, each spacer means being axially movable relative to the shaft; and gland follower means positioned for exerting a force against the packing means for axially compressing each packing means in the housing chamber between the end plate means and the gland follower means, each compression ring thereupon exerting a radial compression force against the radially adjacent packing ring for pressing the packing ring uniformly against the shaft about its circumference.

2. The shaft sealing assembly of claim 1 wherein each spacer means is a lantern ring.

3. The shaft sealing assembly of claim 1 wherein each spacer means has an enclosed circumferential chamber therein, the circumferential chamber having an input port and an exit port.

4. The shaft sealing assembly of claim 3, the elongated housing having a longitudinal slot means therealong, the input and exit ports being aligned with the slot means for providing connection access thereto at any of a plurality of axial locations of the axially movable spacer means.

5. The shaft sealing means of claim 3, each spacer means further having a radial passageway therethrough, each radial passageway having an opening adjacent to the surface of the shaft for providing a means through which lubrication can be applied to the shaft.

* * * * *